United States Patent
Cho et al.

(10) Patent No.: US 11,889,923 B2
(45) Date of Patent: Feb. 6, 2024

(54) ACTUATOR FOR RECLINER

(71) Applicant: DAECHANG SEAT CO., LTD-DONGTAN, Hwaseong-si (KR)

(72) Inventors: Chan Ki Cho, Gangwon-do (KR); Myung Soo Lee, Osan-si (KR); Sin Chan Yang, Hwaseong-si (KR); In Sun Baek, Hwaseong-si (KR)

(73) Assignee: DAECHANG SEAT CO., LTD-DONGTAN, Hwaseong-si (KR)

( * ) Notice: Subject to any disclaimer, the term of this patent is extended or adjusted under 35 U.S.C. 154(b) by 86 days.

(21) Appl. No.: 17/668,856

(22) Filed: Feb. 10, 2022

(65) Prior Publication Data

US 2022/0295991 A1 Sep. 22, 2022

(30) Foreign Application Priority Data

Mar. 22, 2021 (KR) .......................... 10-2021-0036553

(51) Int. Cl.
*A47C 1/025* (2006.01)
*A47C 1/024* (2006.01)

(52) U.S. Cl.
CPC ............ *A47C 1/025* (2013.01); *A47C 1/0242* (2013.01)

(58) Field of Classification Search
CPC ............................... A47C 1/025; A47C 1/0242
See application file for complete search history.

(56) References Cited

U.S. PATENT DOCUMENTS

| 2002/0113472 | A1* | 8/2002 | Blendea | B60N 2/0232 |
| | | | | 297/284.4 |
| 2004/0080200 | A1* | 4/2004 | Golynsky | A47C 1/026 |
| | | | | 297/301.5 |
| 2005/0280298 | A1 | 12/2005 | Hsiao | |
| 2010/0164265 | A1 | 7/2010 | Tomandl | |

FOREIGN PATENT DOCUMENTS

| JP | 2009-208555 A | 9/2009 |
| JP | 2011-106535 A | 6/2011 |
| KR | 10-2019-0052941 A | 5/2019 |

(Continued)

OTHER PUBLICATIONS

The State Intellectual Property Office of People's Republic of China, Office Action dated May 29, 2023 concerning the corresponding CN patent application 202210121979.2 and its English translation (12 pages).

(Continued)

*Primary Examiner* — Randell J Krug
(74) *Attorney, Agent, or Firm* — Lucas & Mercanti, LLP (57) ABSTRACT

Proposed is an actuator for a recliner which can be manufactured with components having simple structures to reduce weight, and functions of a seat operated through different cables are independently performed stably. The actuator for a recliner includes: a casing part, and a drive part provided with a worm wheel gear located inside the casing part and rotated by an operation of a motor, and a rack gear configured to move elastically toward a first or second side of the drive part in engagement with the worm wheel gear, with cables being coupled respectively to the first and second sides of the rack gear.

3 Claims, 5 Drawing Sheets

(56) References Cited

FOREIGN PATENT DOCUMENTS

KR          10-2039609  B1    11/2019
KR     10-2020-0062734  A     6/2020

OTHER PUBLICATIONS

European Patent Office, extended European search report dated Jul. 14, 2022 concerning the corresponding EP patent application 22154027.1 (6 pages).
Korean Intellectual Property Office, Office Action dated Jul. 18, 2022 concerning the corresponding KR patent application 10-2021-0036553 and its English translation (5 pages).
Korean Intellectual Property Office, Decision to Grant a Patent dated Jan. 20, 2023 concerning the corresponding KR patent application 10-2021-0036553 and its English translation (2 pages).

* cited by examiner

ACTUATOR FOR RECLINER

CROSS REFERENCE TO RELATED APPLICATION

The present application claims priority to Korean Patent Application No. 10-2021-0036553, filed Mar. 22, 2021, the entire contents of which is incorporated herein by reference for all purposes.

FIELD OF THE INVENTION

The present disclosure relates generally to an actuator for a recliner. More particularly, the present disclosure relates to an actuator for a recliner which is used in a vehicle seat.

BACKGROUND OF THE INVENTION

Unless otherwise indicated in this specification, contents described herein are not included in a prior art for the claims of this application, and although described herein, the contents are not admitted as a prior art.

In general, seats installed inside a vehicle can be folded through recliners, and due to the folding of the seats, space occupied by the seats can be used for multiple purposes, thereby improving convenience inside the vehicle.

Convenience features that passengers can enjoy inside a vehicle are increasing through convenience devices provided inside electric vehicles, autonomous vehicles, and camper vans, and following this trend, demand for space utilization according to the change of seat position is increasing.

In addition, in the case of electric vehicles, autonomous vehicles, and camper vans, since the utilization of indoor space and fuel efficiency is important, a structural change is necessary to reduce space and weight occupied by remaining parts of seats except for a seat on which a passenger is seated.

However, in the case of an actuator mounted on an existing vehicle for the electrically folding, walk-in or reclining operation of a seat, the actuator has complicated structure or due to the use of a plurality of parts, is difficult to be assembled and has increased weight, which reduces the fuel efficiency of the vehicle. There are disadvantages.

For example, Korean Patent No. 10-2039609 discloses "ELECTRIC ACTUATOR FOR FOLDING SEAT", and Korean Patent Application Publication No. 10-2020-0062734 teaches "DUAL RELEASE ACTUATOR OF SEAT FOR VEHICLE".

However, existing inventions do not disclose a technology for reducing fuel efficiency, weight, and manufacturing cost of a vehicle.

SUMMARY OF THE INVENTION

Accordingly, the present disclosure has been made keeping in mind the above problems occurring in the related art, and the present disclosure is intended to propose an actuator for a recliner which can be manufactured with components having simple structures to reduce weight, and functions of a seat operated through different cables are independently performed stably.

In addition, the present disclosure is not limited to technical objectives described above, and it is obvious that other technical objectives may be derived from the following description.

In order to achieve the above objectives, according to an embodiment of the present disclosure, an actuator for a recliner includes: a casing part, and a drive part provided with a worm wheel gear located inside the casing part and rotated by an operation of a motor, and a rack gear configured to move elastically toward a first or second side of the drive part in engagement with the worm wheel gear, with cables being coupled respectively to the first and second sides of the rack gear.

In addition, the rack gear may include: insertion holes formed through portions of a front surface of the rack gear, a head of each of the cables being inserted into each of the insertion holes so as to move to opposite sides thereof, and a fixing groove formed in such a manner that a front surface of a side of the insertion hole is recessed such that the fixing groove is connected to the insertion hole and opposite external spaces, the fixing groove having a height smaller than the head.

Furthermore, the rack gear may include: fixing members being in close contact with a spring fixed to the casing part and elastically transformed at an initial position thereof, with the spring between the fixing members, and a slider provided by protruding from a rear of the rack gear so as to have a shape of a stick extending toward the opposite sides of the rack gear.

Additionally, the drive part may further include a pinion gear provided by protruding forward from a center of the worm wheel gear such that the pinion gear engages with the rack gear.

In addition, the heads of the cables may be respectively inserted into the insertion holes and may be in close contact with inner surfaces of the first and second sides of the rack gear, wherein according to a moving direction of the rack gear, only one of the heads of the cables may be pulled.

According to an embodiment disclosed herein, the actuator for a recliner is assembled with components having simple structures to reduce manufacturing cost and weight, and while one of cables is pulled, the operation of a remaining cable is restricted, thereby stably performing one of the walk-in and folding function of a seat.

In addition, the actuator for a recliner can be manufactured to be slim in front-to-rear thickness thereof, thereby facilitating the installation of the actuator in narrow space between seats, and the overlapping areas of components to each other are minimized, thereby minimizing noise due to friction or collision therebetween.

Furthermore, the effects of the present disclosure described above are naturally exhibited by the described contents regardless of whether the inventor of the actuator for a recliner recognizes the effects. Accordingly, the above-described effects are only a few effects according to the described contents and should not be recognized as describing all effects that the inventor has grasped or all effects that exist.

Additionally, other effects of the actuator for a recliner of the present disclosure should be further grasped by the overall description of the present specification, and if the other effects can be recognized through this specification by those skilled in the art to which the described content belongs even if the other effects are not described in explicit sentences, the other effects should be considered as effects described in the present specification.

BRIEF DESCRIPTION OF THE DRAWINGS

The above and other objectives, features, and other advantages of the present disclosure will be more clearly under

DETAILED DESCRIPTION OF THE INVENTION

Hereinafter, the configuration, operation, and effects of an actuator for a recliner according to an exemplary embodiment of the present disclosure will be described with reference to the accompanying drawings. For reference, in the following drawings, each component is omitted or schematically illustrated for the convenience and clarity of the description of the present disclosure, and the size of each component does not reflect the actual size. Additionally, the same reference numerals refer to the same components throughout the specification, and reference numerals for the same components in individual drawings will be omitted.

As illustrated in FIGS. 1, 2, 3, 4, 5A, and 5B, the actuator 100 for a recliner includes a casing part 200, a drive part 400, and a controller 500, wherein the drive part 400 is coupled to first and second cables connected to a seat walk-in recliner and a seat-folding recliner, respectively.

According to the actuator 100 for a recliner, when a walk-in button or a seat folding button is operated in a vehicle, a portion of the drive part 400 pulls one of the first and second cables while moving toward a first or second side such that a state in which the walk-in or folding operation of a seat is possible is maintained for a predetermined period of time.

For example, when the walk-in button is operated by a passenger, the actuator 100 for a recliner pulls the first cable for a predetermined period of time to maintain the walk-in operation state of a seat for the predetermined period of time. In this case, the passenger can move the seat for the predetermined period of time.

When the walk-in button is operated, a period of time for which the actuator 100 for a recliner pulls the first cable is preferably 1.5 seconds, and when the seat folding button is operated, a period of time for which the actuator 100 for a recliner pulls the second cable is preferably 10 seconds.

The casing part 200 includes a rear casing 210 and a front casing 220.

The casing part 200 is coupled removably to a seat frame or a surrounding portion of a seat, and the drive part 400 is disposed inside the casing part 200. The first and second cables are inserted into the casing part 200 respectively from the first and second sides of the casing part 200 and are coupled to the drive part 400.

The rear casing 210 has semi-cylindrical groove formed in a lower part of the first side thereof such that a motor can be disposed in the semi-cylindrical groove, and has a cylindrical protrusion formed on the second side of the rear casing 210 such that a worm gear and a worm wheel gear engaging with the worm gear are disposed at the second side.

The front casing 220 is coupled removably to the front of the rear casing 210 so as to cover the worm gear and the worm wheel gear, which stably fixes the drive part 400 including the motor.

The drive part 400 includes the motor 410, the worm gear 420, the worm wheel gear 430, a rotation shaft 435, a pinion gear 440, a rack gear 450, a spring 460, a first sliding cover 470, and a second sliding cover 480.

The first cable includes a first cable head 610 and a first cable core 620, and the second cable includes a second cable head 630 and a second cable core 640.

Inside the casing part 200, the drive part 400 is arranged such that a part of the drive part 400 elastically slides toward the first or second side, wherein each of the first and second cable heads 610 and 630 is coupled removably to the drive part 400.

The motor 410 is disposed inside the casing part 200 such that a drive shaft of the motor located at a position corresponding to the lower part of the first side of the casing part 200 protrudes toward the second side of the casing part 200, and the worm gear 420 is coupled to the drive shaft and rotates by using the drive shaft as a shaft according to the rotation of the drive shaft.

The worm wheel gear 430 is configured in the form of a circular plate and has a plurality of teeth formed on the outer side thereof such that the teeth engage with the worm gear 420. With the worm wheel gear 430 located at the upper side of the worm gear 420 engaging with the worm gear 420, the worm wheel gear 430 is disposed to rotate relative to the front-to-rear directional shaft inside the casing part 200.

The rotation shaft 435 is formed in a cylindrical shape extending from the rear casing 210 to the front casing 220, passes through the centers of the worm wheel gear 430 and the pinion gear 440, and is rotatably coupled to the front casing 220.

The pinion gear 440 is formed to protrude forward from the center of the front of the worm wheel gear 430 and rotates by engaging teeth formed on the outer side of the pinion gear 440 with the rack gear 450 disposed on the upper side of the pinion gear 440 such that the rack gear 450 moves toward the first or second side.

The rack gear 450 is formed in the form of a vertical plate extending toward opposite sides and is disposed in front of the worm wheel gear 430 such that teeth 451 protruding from the lower part of the rack gear 450 engage with the upper part of the pinion gear 440, wherein the upper end of the rack gear 450 is in close contact with the spring 460.

An insertion hole 452 is located at the first side of the rack gear 450 and is famed rearward through a portion of the front surface of the rack gear 450 having a rectangular shape extending toward the opposite sides so as to connect the front and rear spaces of the rack gear 450 to each other.

The first cable head 610 is inserted into the insertion hole 452, and in a state in which the rack gear 450 does not pull the first and second cables toward the second and first sides, respectively, a portion of the first cable head 610 is in close contact with the inner surface of the rack gear 450 corresponding to the first side of the insertion hole 452.

A fixing groove 452a is located at the first side of the insertion hole 452 and is configured in such a manner that a portion of the front surface of the rack gear 450 located at height lower than the insertion hole 452 is recessed rearward by a predetermined distance such that the fixing groove 452a is connected to the insertion hole 452, the front of the rack gear 450, and the first side space of the rack gear 450.

The first cable core 620 is inserted into the fixing groove 452a, and since the first cable head 610 is larger in volume than the fixing groove 452a, the insertion of the first cable head 610 into the inner space of the fixing groove 452a is restricted.

An insertion hole 453 is located at the second side of the rack gear 450 and is famed rearward through a portion of the front surface of the rack gear 450 having a rectangular shape extending toward the opposite sides so as to connect the front and rear spaces of the rack gear 450 to each other.

The second cable head 630 is inserted into the insertion hole 453, and in a state in which the rack gear 450 does not pull the first and second cables toward the second and first sides, respectively, a portion of the second cable head 630 is in close contact with the inner surface of the rack gear 450 corresponding to the second side of the insertion hole 453.

A fixing groove 453a is located at the second side of the insertion hole 453 and is configured in such a manner that a portion of the front surface of the rack gear 450 located at height lower than the insertion hole 453 is recessed rearward by a predetermined distance such that the fixing groove 453a is connected to the insertion hole 453, the front of the rack gear 450, and the second side space of the rack gear 450.

The second cable core 640 is inserted into the fixing groove 453a, and since the second cable head 630 is larger in volume than the fixing groove 453a, the insertion of the second cable head 630 into the inner space of the fixing groove 453a is restricted.

A fixing member 454 is formed on an upper part of the rack gear 450 spaced apart by a predetermined distance from the end of the first side of the rack gear 450 toward the second side thereof and is in close contact with a center portion of the first side of the spring 460 disposed on the upper side of the rack gear 450, and thus when the rack gear 450 moves toward the second side due to the operation of the motor 410, the fixing member 454 contracts the spring 460 toward the second side.

A fixing member 455 is formed on an upper part of the rack gear 450 spaced part by a predetermined distance from the end of the second side of the rack gear 450 toward the first side thereof and is in close contact with a center portion of the second side of the spring 460 disposed on the upper side of the rack gear 450, and thus when the rack gear 450 moves toward the first side due to the operation of the motor 410, the fixing member 455 contracts the spring 460 toward the first side.

A slider 456 is located at the lower part of the rear surface of the rack gear 450 and is formed in the form of a stick extending toward the opposite sides by rearward protruding a portion of a rear surface of the rack gear having a rectangular shape extending toward the opposite sides.

A sliding groove 457 is configured as space having a cuboid shape in such a manner that a portion of the front surface of the rack gear 450 corresponding to the front of the slider 456 is recessed rearward by a predetermined distance such that the sliding groove 457 is connected to the front of the rack gear 450 and the first and second spaces thereof.

The spring 460 is located between the fixing members 454 and 455 and is fixed between the first and second sliding covers 470 and 480, and is contracted toward the first or second side according to the sliding of the rack gear 450 so as to provide elastic force to the rack gear 450 such that the rack gear 450 moves to an initial position thereof.

The first sliding cover 470 has a first end part formed in the shape of a rectangular vertical plate and is disposed at the rear side of the rack gear 450. The first sliding cover 470 has hooking members 471 formed by forward protruding portions of the first and second sides of the first end part such that the hooking members 471 pass the rack gear 450 and are coupled to the second sliding cover 480.

The first sliding cover 470 has a second end part formed in the shape of a rectangular plate by upward protruding a center portion of the upper part of the first end part and has side walls 472 formed by forward extending the first and second portions of the second end part such that the side walls 472 are in close contact with the first and second portions of the spring 460, respectively.

An upper cover 473 is famed by forward extending the upper edge of the second end part of the first sliding cover 470 by a predetermined distance and covers an upper portion of the spring 460. In a state in which the upper cover 473 is coupled to the second sliding cover 480, the upper cover 473 prevents the spring 460 from being removed from a position thereof.

A holding plate 473a is formed in the shape of a rectangular plate by forward extending a center portion of the upper cover 473, wherein a groove formed in the center of the holding plate 473a is coupled to a protrusion 483a formed on the upper part of the second sliding cover 480.

A rail 474 is formed in the shape of a cuboid by forward protruding a portion of the front surface of the first sliding cover 470 on a horizontal line corresponding to the lower portion of the slider 456 such that the rail 474 is in close contact with the lower surface of the slider 456.

A rail 475 is formed in the shape of a cuboid by forward protruding a portion of the front surface of the first sliding cover 470 on a horizontal line corresponding to the upper portion of the slider 456 such that the rail 475 is in close contact with the upper surface of the slider 456.

Accordingly, with the slider 456 disposed between the rails 474 and 475, the rack gear 450 can stably slide toward the first or second side and can be effectively prevented from being slanted by the elasticity of the spring 460.

The second sliding cover 480 has a first end part formed in the form of a rectangular vertical plate, wherein a portion of each of the opposite sides of the first end part of the second sliding cover 480 extends downward in the form of a plate and is coupled to each of the hooking members 471. The front surface of the second sliding cover 480 is in surface contact with the front casing 220.

The second sliding cover 480 has a second end part formed in the shape of a rectangular plate by upward protruding an upper central part of the first end part thereof and has side walls 482 formed by rearward extending portions of the first and second ends of the second end part such that the side walls 482 are in close contact with the first and second portions of the spring 460, respectively.

In a state in which the first and second sliding covers 470 and 480 are coupled to each other, the side walls 472 and 482 are spaced apart from each other by a distance less than the thickness of the front-to-rear direction of the spring 460, and the fixing members 454 and 455 pass through space between the side walls 472 and 482 to move to the first or second side space of the first and second sliding covers 470 and 480.

An upper cover 483 is formed by rearward extending the upper edge of the second end part of the second sliding cover 480 by a predetermined distance and covers an upper portion of the spring 460. In a state in which the upper cover 483 is coupled to the first sliding cover 470, the upper cover 483 is in close contact with the upper cover 473 and covers the upper part of the spring 460.

The upper cover 483 has a center portion formed thereon in the shape of a plate by extending upward therefrom such that the center portion of the upper cover 483 is coupled to the front casing 220, wherein a groove into which the holding plate 473a is inserted is formed in the center portion, and a holding jaw is famed under the groove.

A slider 481 is formed in the shape of a cuboid extending toward opposite sides by rearward protruding a portion of the rear surface of the second sliding cover 480. When the actuator 100 for a recliner is assembled, the slider 481 is inserted into the sliding groove 457 and guides the movement of the rack gear 450.

Figure 1:
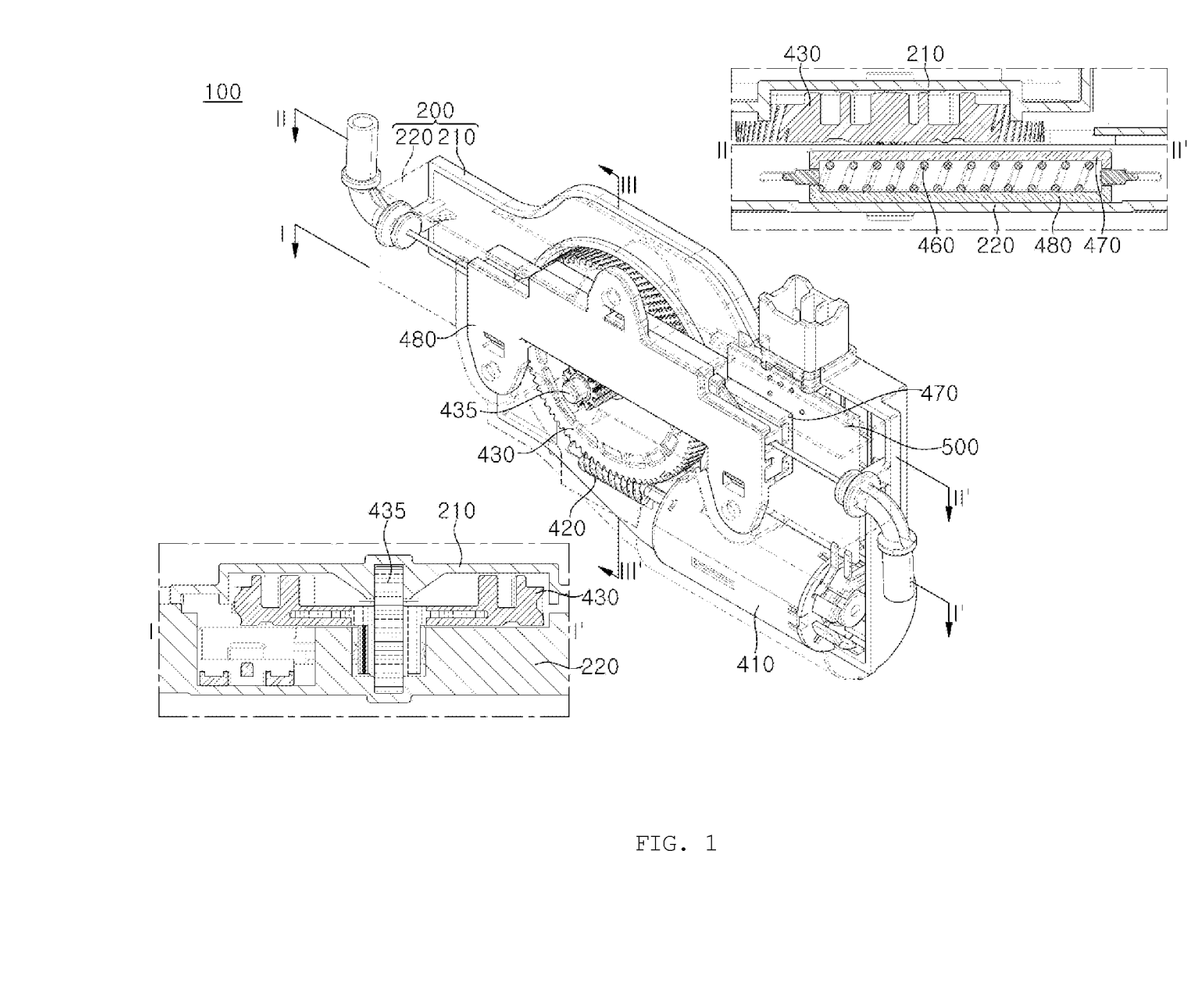
- FIG. 1 is a perspective view of an actuator for a recliner according to an embodiment disclosed in this specification.
Figure 2:
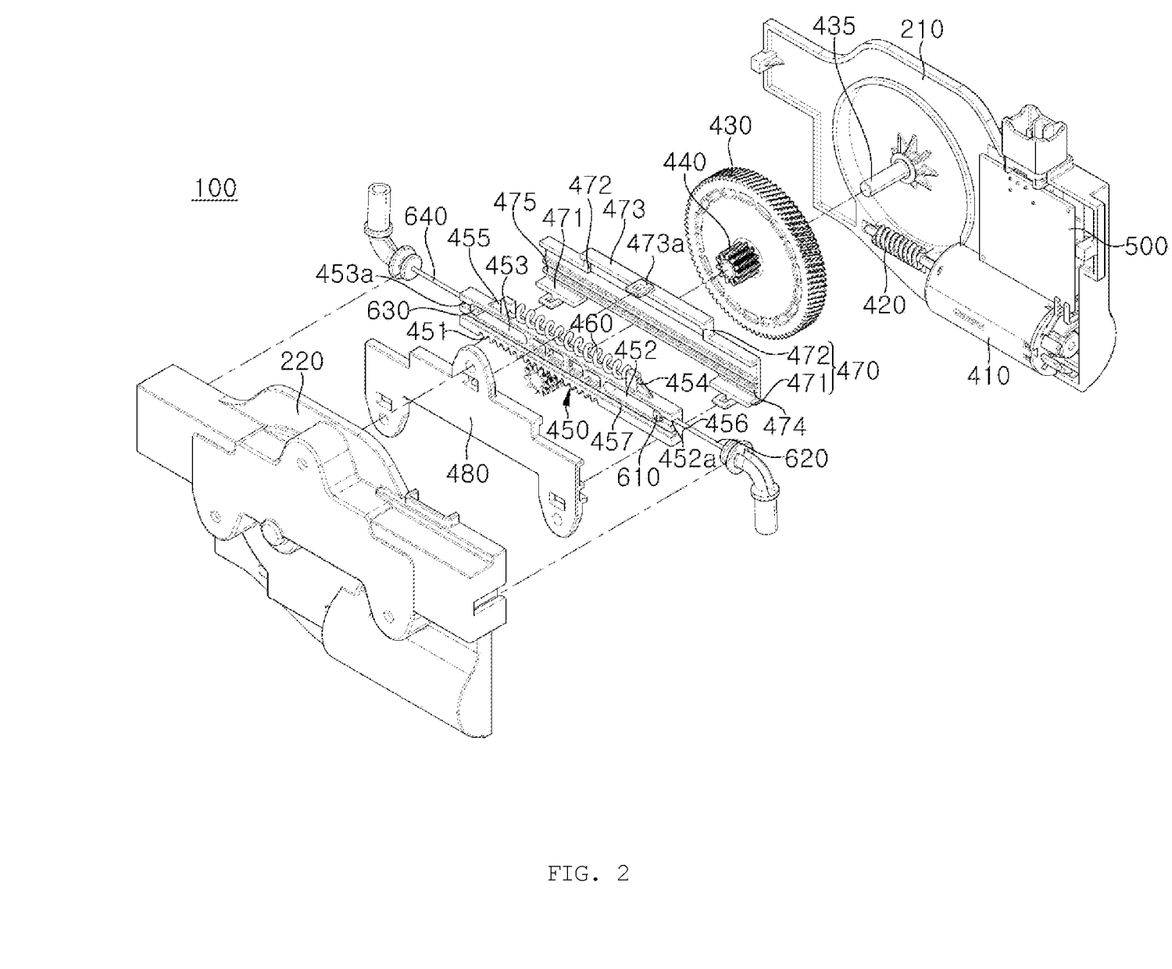
FIGS. 2 and 3 are exploded perspective views of the actuator for a recliner of FIG. 1.
Figure 3:
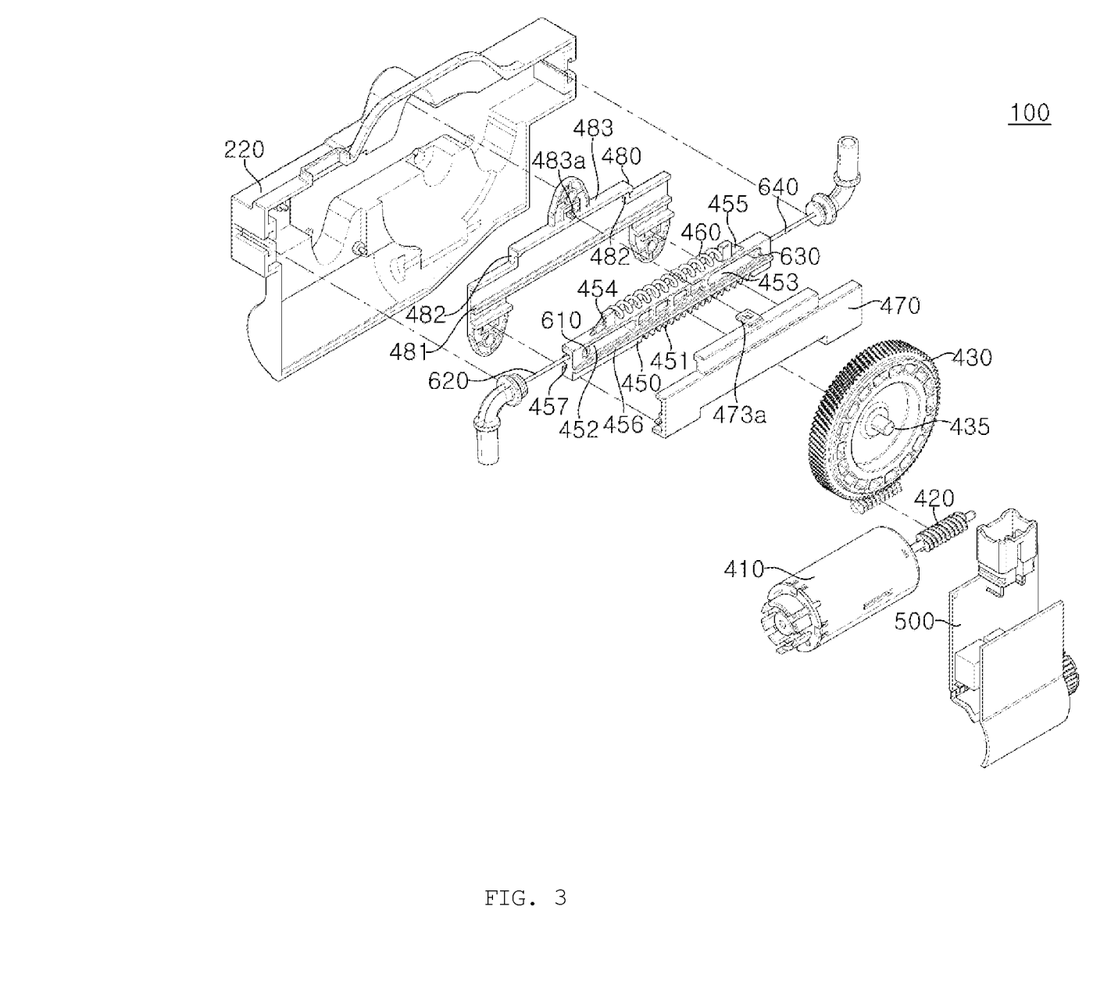
Figure 4:
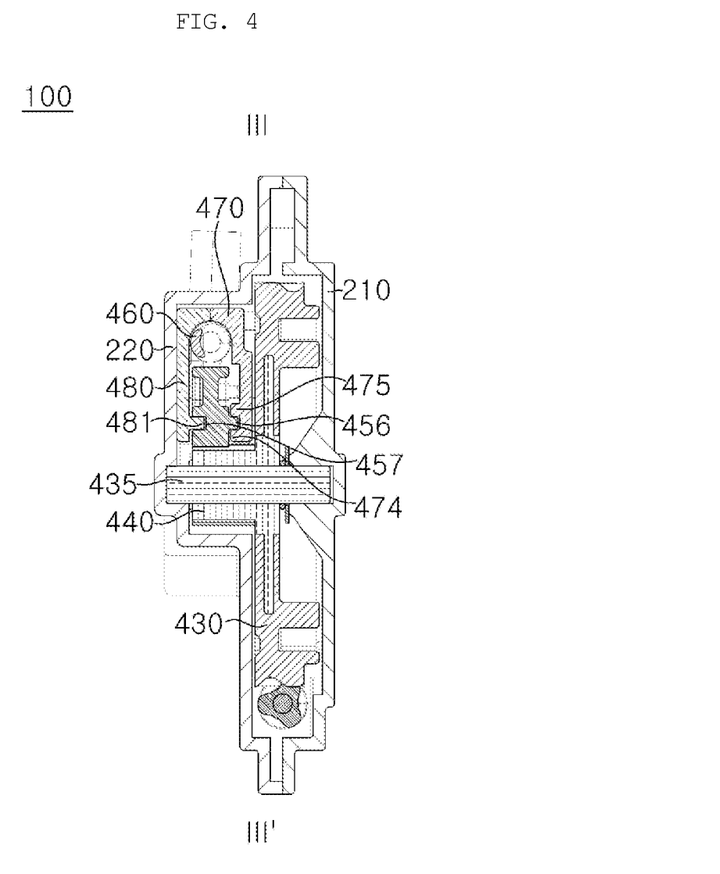
FIG. 4 is a sectional view taken along line of the actuator for a recliner of FIG. 1.
Figure 5A:
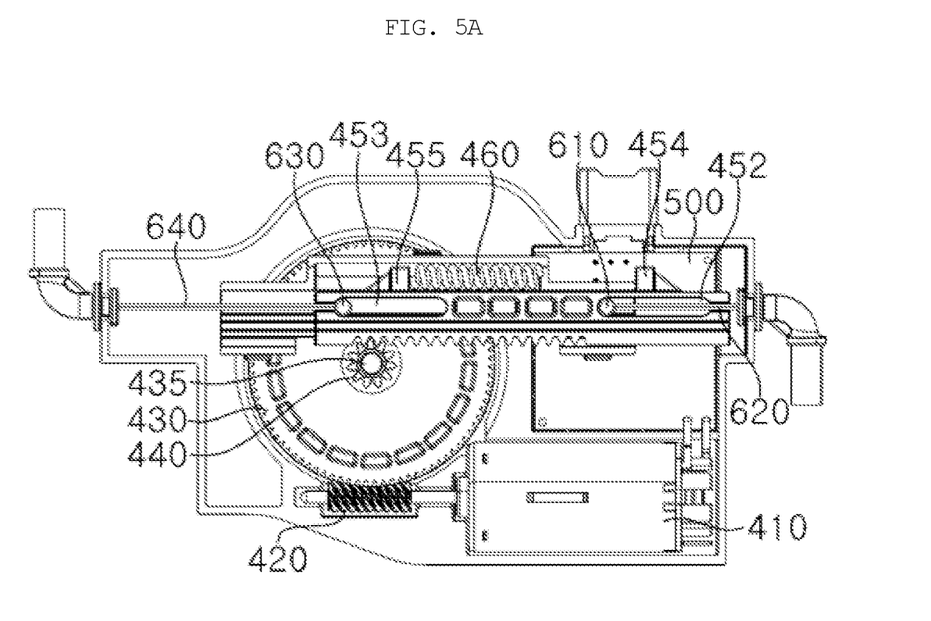
FIGS. 5A and 5B are schematic views of the actuator for a recliner of FIG. 1.
Figure 5B:
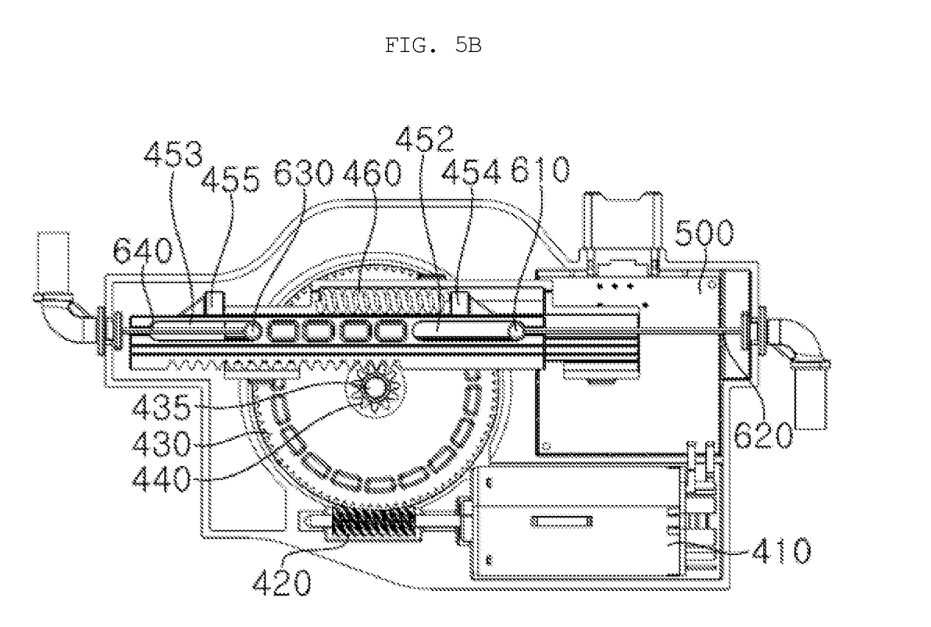

As illustrated in FIGS. 4, 5A, and 5B, when the worm gear 420, the worm wheel gear 430, and the pinion gear 440 rotate clockwise due to the operation of the motor 410, the rack gear 450 moves toward the first side, and the second cable head 630 is moved toward the first side by the rack gear 450.

In the process in which the second cable head 630 is pulled, the first cable head 610 is located at an initial position due to the insertion hole 452, and the fixing member 455 presses the second side of the spring 460 toward the first side thereof to contract the spring 460.

Through the control of stopping the drive shaft of the motor 410 by the controller 500, the pulled state of the second cable head 630 is maintained, and when the folding operation of a seat is completed for the period of time for which the second cable head 630 is pulled, the motor 410 automatically operates and releases the stop state of the drive shaft of the motor 410 such that the worm gear 420 is rotated counterclockwise at a predetermined angle or the drive shaft is rotated by the elasticity of the spring 460.

In this case, when the stop state of the drive shaft of the motor 410 is released or the worm gear 420 is rotated counterclockwise at a predetermined angle, the rack gear 450 is moved by a predetermined distance toward the second side by the elasticity of the spring 460 and is restored to an initial position thereof.

In the state in which the rack gear 450 is restored to the initial position thereof, the first and second cable heads 610 and 630 are located respectively in the insertion holes 452 and 453 to be in close contact with the inner surfaces of the first and second sides of the rack gear 450.

When the worm gear 420, the worm wheel gear 430, and the pinion gear 440 rotate counterclockwise due to the operation of the motor 410, the rack gear 450 moves toward the second side, and the first cable head 610 is moved toward the second side by the rack gear 450.

In the process in which the first cable head 610 is pulled, the second cable head 630 is located at an initial position thereof due to the insertion hole 453, and the fixing member 454 presses the first side of the spring 460 toward the second side to contract the spring 460.

Through the control of stopping the drive shaft of the motor 410 by the controller 500, the pulled state of the first cable head 610 is maintained, and when the walk-in operation of a seat is completed for a period of time for which the first cable head 610 is pulled, the motor 410 automatically operates and releases the stop state of the drive shaft of the motor 410 such that the worm gear 420 is rotated clockwise at a predetermined angle or the drive shaft is rotated by the elasticity of the spring 460.

In this case, when the stop state of the drive shaft of the motor 410 is released or the worm gear 420 is rotated clockwise at a predetermined angle, the rack gear 450 is moved by a predetermined distance toward the first side by the elasticity of the spring 460 and is restored to an initial position thereof.

In a state in which the rack gear 450 is restored to the initial position, the first and second cable heads 610 and 630 are located respectively in the insertion holes 452 and 453 to be in close contact with the inner surfaces of the first and second sides of the rack gear 450.

Meanwhile, the insertion holes 452 and 453 formed in the rack gear 450 may be connected to each other and may be configured as the shape of a single insertion hole extending toward the opposite sides, and in order to maintain the tightly pulled states of each of the first and second cable heads 610 and 630, a U-shaped bracket is inserted into insertion holes corresponding to positions between the first and second cable heads 610 and 630 and the fixing grooves 452a and 453a so as to fix each of the first and second cable heads 610 and 630 to the center portion of the rack gear 450.

Although the exemplary embodiment of the present disclosure has been described with reference to the accompanying drawings, the embodiment described in the present specification and configurations shown in the drawings are only the exemplary embodiment of the present disclosure, but do not represent all the technical ideas of the present disclosure. Therefore, it should be understood that there may be various equivalents and modifications that can be substituted for them at the time of filing the present application. Therefore, the embodiment described above is to be understood as illustrative and not restrictive in all respects, and the scope of the present disclosure is indicated by the following claims rather than the detailed description, and the meaning and scope of the claims and all changes or modifications derived from concept equivalent thereto should be construed as being included in the scope of the present disclosure.

What is claimed is:

1. An actuator for a recliner, the actuator comprising:
    a casing part, and
    a drive part provided with a worm wheel gear located inside the casing part and rotated by an operation of a motor, and a rack gear configured to move elastically toward a first or second side of the drive part in engagement with the worm wheel gear, with cables being coupled respectively to the first and second sides of the rack gear,
    wherein the rack gear comprises
        insertion holes formed through portions of a front surface of the rack gear,
        a head of each of the cables being inserted into each of the insertion holes so as to move to opposite sides thereof,
        a fixing groove formed in such a manner that a front surface of a side of the insertion hole is recessed such that the fixing groove is connected to the insertion hole and opposite external spaces, the fixing groove having a height smaller than the head,
        fixing members being in contact with a spring fixed to the casing part and elastically transformed at an initial position thereof, with the spring between the fixing members, and
        a slider provided by protruding from a rear of the rack gear so as to have a shape of a stick extending toward the opposite sides of the rack gear.

2. The actuator of claim 1, wherein the drive part further comprises a pinion gear provided by protruding forward from a center of the worm wheel gear such that the pinion gear engages with the rack gear.

3. The actuator of claim 1, wherein the heads of the cables are respectively inserted into the insertion holes and are in contact with inner surfaces of the first and second sides of the rack gear, wherein according to a moving direction of the rack gear, only one of the heads is pulled.

* * * * *